Figure 4:
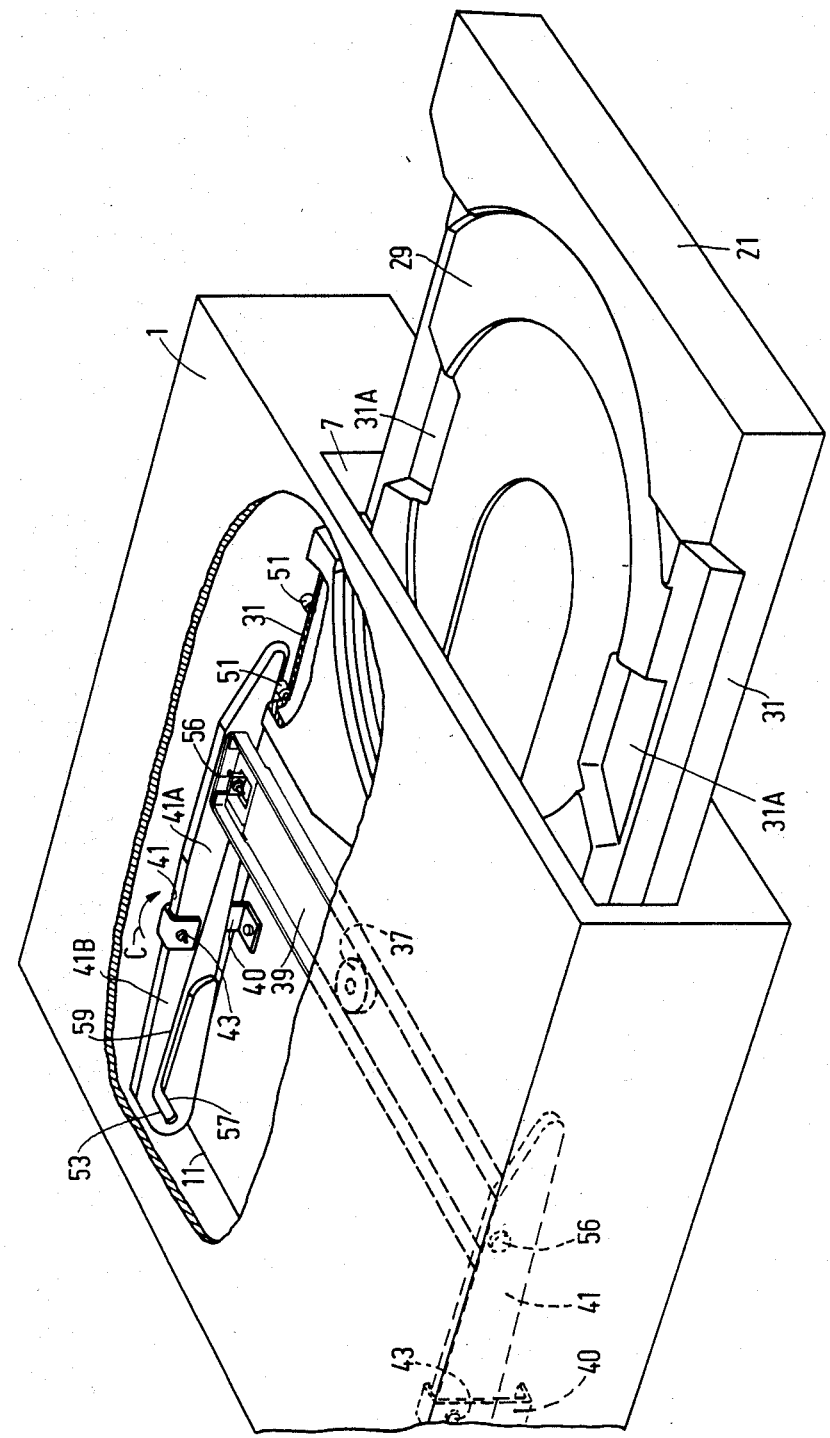

United States Patent [19]

Eijsermans

[11] Patent Number: 4,715,025
[45] Date of Patent: Dec. 22, 1987

[54] DISC-RECORD PLAYER COMPRISING A DISC-LOADING MECHANISM

[75] Inventor: Antonius A. C. C. Eijsermans, Eindhoven, Netherlands

[73] Assignee: U.S. Philips Corporation, New York, N.Y.

[21] Appl. No.: 768,399

[22] Filed: Aug. 22, 1985

[30] Foreign Application Priority Data

Mar. 4, 1985 [NL] Netherlands .................. 8500593

[51] Int. Cl.$^4$ ............... G11B 17/04; G11B 1/00
[52] U.S. Cl. .................................................... 369/75.2
[58] Field of Search ................. 369/75.1, 75.2, 77.2

[56] References Cited

U.S. PATENT DOCUMENTS 4,479,210 10/1984 Nakayama ..................... 369/75.2
4,561,085 12/1985 Funabashi ..................... 369/75.2

Primary Examiner—Steven L. Stephan
Attorney, Agent, or Firm—F. Brice Faller

[57] ABSTRACT

The invention relates to a disc-record player, comprising a disc-loading mechanism, a frame (11), and a turntable (13) mounted in said frame, which loading mechanism comprises a movable drawer (21), for transferring the disc to and removing it from the turntable, and a movable pressure-member support (39) carrying a disc pressure member (37), for pressing the disc onto the turntable in the operative position. The pressure-member-support cooperates with at least one lever (41) adjacent the turntable, which lever extends in the inward direction of movement of the drawer, comprises a first lever arm (41A) and behind it a second lever arm (41B), and is movable about a pivot (43), which is situated between the first and the second lever arm and which is mounted in the frame. The first lever arm is positioned against the pressure-member support and the second lever arm carries a first coupling means which is cooperable with a second coupling means on the drawer, one of the coupling means comprising a wall portion (53) which is inclined viewed in the inward direction of movement of the drawer and over which a guide element (51) of the other coupling means moves during the inward movement of the drawer for pivoting the lever and bringing the disc pressure member into the operative position.

5 Claims, 4 Drawing Figures

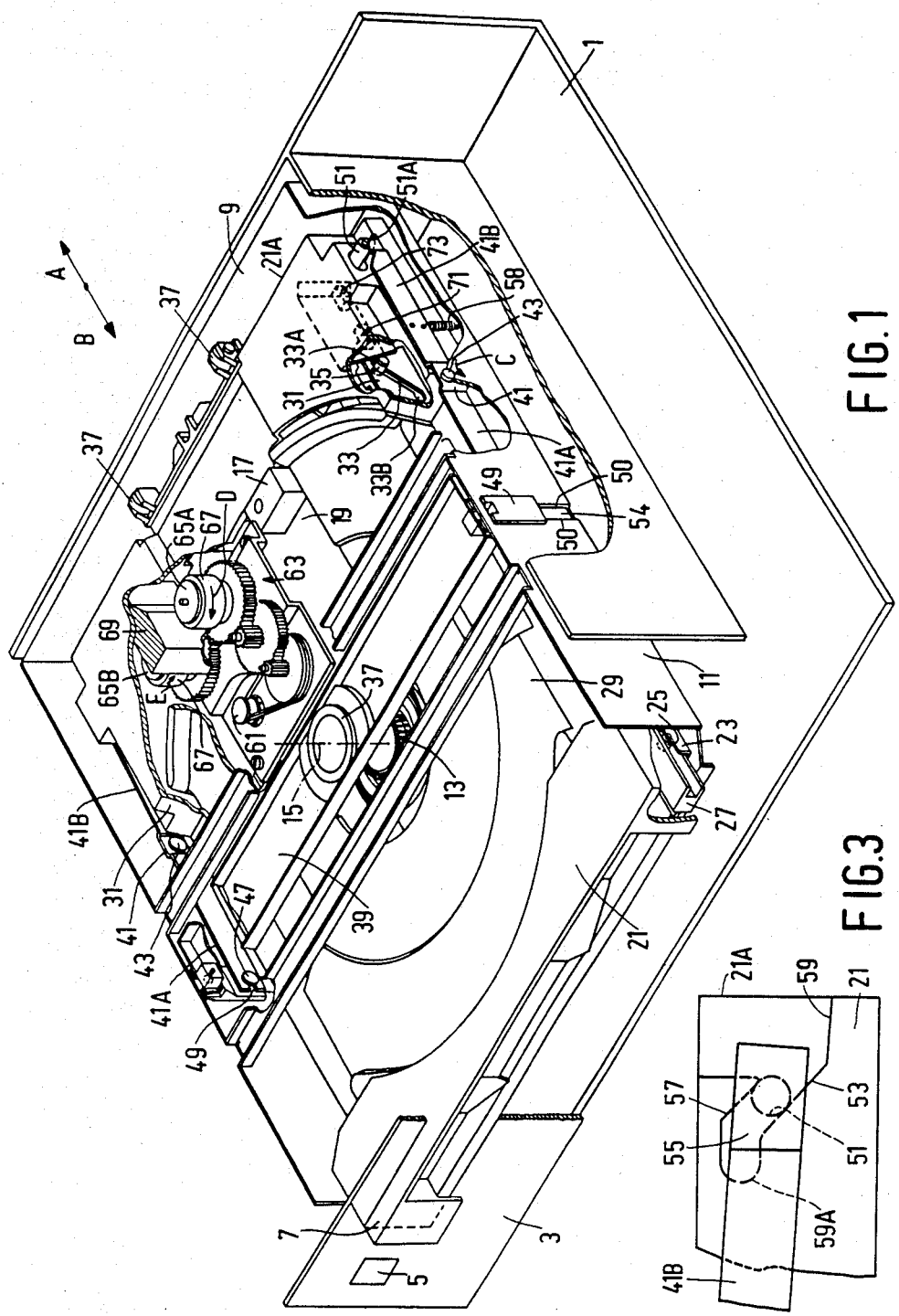

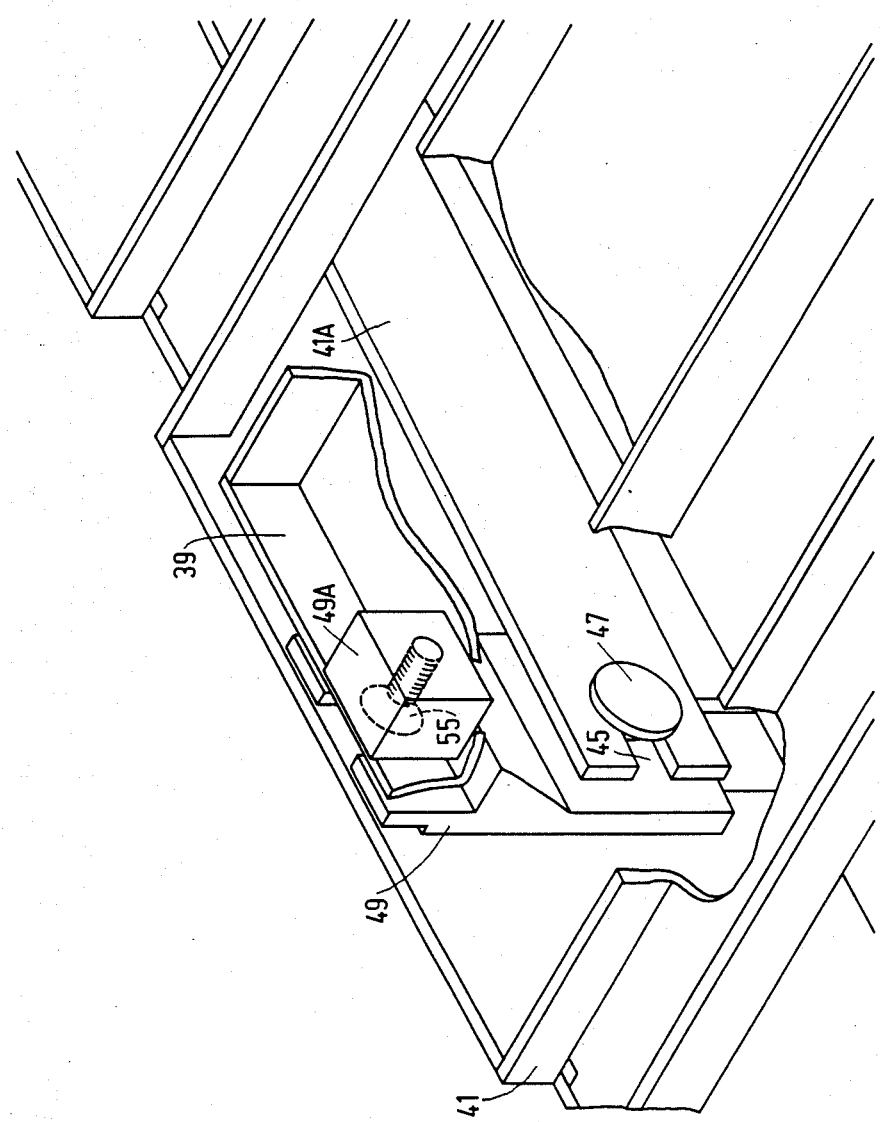

DISC-RECORD PLAYER COMPRISING A DISC-LOADING MECHANISM

BACKGROUND OF THE INVENTION

The invention relates to a disc-record player for optically readable discs and includes a disc-loading mechanism, a housing, a frame, and a turntable which is mounted for rotation in the frame. The loading mechanism comprises a drawer, which is movable in an inward direction and an outward direction through a front opening in the housing for transferring the disc to and removing it from the turntable, respectively, and a pressure member support carrying a pressure member, which support is movable between an operative position for urging the disc against the turntable and a position which is more remote from the turntable.

Such a disc-record player is disclosed in Netherlands Patent Application No. 8302129, to which U.S. Pat. No. 4,672,598 corresponds (herewith incorporated by reference). In principle, the known disc-record player is intended for playing optically readable audio discs of the "Compact-Disc" type. In the known player the drawer carries a vertically movable transfer means for the disc. Further, the drawer comprises two upright side walls, which extend over the entire depth of the drawer and which are formed with a number of first and second grooves or slots which are downwardly inclined viewed in the outward direction. The first grooves are situated near the front and back of the drawer and serve for guiding the transfer means. The second grooves, which are situated between the first grooves, cooperate with laterally projecting pins on the pressure-member support. During the inward and outward movement of the drawer these pins are guided in the second grooves to move the pressure-member support towards and away from the turntable. This has the disadvantage that the upright side walls constitute obstacles when a disc is placed on or removed from the transfer means of the drawer. Therefore, additional steps are necessary to provide better access to the transfer means of the drawer and thereby facilitate loading and removal of a disc. For example, the drawer can be slid out of the housing so far that the disc on the drawer is situated completely outside the housing and is thus better accessible. However, in the fully extended position the drawer occupies a substantial amount of space, which is undesirable an audio-disc player used in a motor car, where the available space is generally limited. In a video-disc player, which uses discs of comparatively large diameter, a fully extended drawer may also give rise to problems. Another possibility of solving the problem outlined above is to increase the width of the drawer, in order to provide enough room between the side walls of the drawer and a disc, so as to enable the disc to be removed by hand. However, as this obviously leads to an increased width of the housing of the player, this solution is in conflict with the requirement that the player should be as compact as possible.

SUMMARY OF THE INVENTION

It is the object of the invention to provide a disc-record player which can be accommodated in a compact housing and is convenient to use.

To this end the pressure-member support cooperates with at least one lever which is arranged adjacent the turntable and extends in the inward direction of movement of the drawer. Each lever has a first lever arm and a second lever arm, situated behind said first arm, and is pivotable about a spindle situated between the first lever arm and the second lever arm and supported in the frame. The first lever arm cooperates with the pressure arm and the second lever arm carries a first coupling means for cooperation with a second coupling means on the drawer. One of the coupling means has a wall portion which is inclined viewed in the inward direction of movement of the drawer, a guide element of the other coupling means moving over the wall portion during the inward movement of the drawer to cause the lever to be pivoted and the pressure member to be brought into the operative position.

These inventive steps enable the drawer to be constructed without the side walls which are necessary in the known player. Thus, it is possible to reduce the width and the height of the drawer. Moreover, the disc can be inserted and removed without difficulty although in the extended position the drawer projects only partly from the housing. Furthermore, the fact that the drawer extends only partly from the housing not only has the advantage that it occupies less room, but also that a simpler construction may be used for supporting the drawer.

Another important advantage is that the relationship between the pressure exerted by the pressure member on the disc lying on the turntable and the actuating force required to move the drawer into the housing can be defined accurately by the profile of the inclined wall portion and by the ratio between the lengths of the two lever arms of the lever. For example, the inclined wall portion may have such a shape that the actuating force remains substantially constant during the entire inward movement, which is important in particular in the case of a motor-driven drawer.

In a player in which the drawer extends horizontally and the disc is lowered onto the turntable, the inclined wall portion extends downwardly viewed in the direction of the inward movement of the drawer, in order to ensure that during the inward movement of the drawer the lever is pivoted in such a way that the pressure-member support is moved towards the turntable. In other constructions the wall portion may have an upwardly extending profile.

The inclined wall portion may form part of a groove or slot in which the guide element is movable. As the guide element moves in the groove or slot during outward movement of the drawer the pressure member is moved out of its operative position. This ensures in a simple manner that the disc pressure member is disengaged from the disc on the turntable at the correct instant, after which the disc can be brought outside the housing during the remainder of the outward movement of the drawer. The pressure-member support with the disc pressure member can be maintained in clear of the turntable manners, for example in that the weight distribution of the lever is such that said lever remains in its tilted position which corresponds to the lastmentioned position of the pressure-member arm. Alternatively, it is possible to employ a resilient element, such as a helical spring.

Another embodiment is characterized in that the first coupling means of the second lever arm comprises a guide element constructed as a rotatable roller and the second coupling means of the drawer comprises said inclined wall portion. In modern disc-record players of the type intended here the drawers are generally injection-moulded from a plastics material. In the present embodiment the inclined wall portion can be formed during injection-moulding of the drawer. This merely demands a slight adaptation of the dies of the injection-moulding machine in conformity with the shape of said wall portion.

In the present embodiment the guide element is constructed as a rotatable roller, which is secured to the lever and which extends transversely of the player for cooperation with the inclined wall portion. As a result of this, the side walls of the drawer can be flat, which facilitates mounting and removal of the drawer. Moreover, the front opening in the housing can have a limited width, which may be important from an aesthetic point of view.

Another preferred embodiment is characterized in that a second lever, comprising a first lever arm and a second lever arm extends parallel to the said lever and is supported in the frame, the levers being situated at opposite sides of the turntable. This results in a symmetrical loading mechanism, which has the advantage that during the inward movement a symmetrical load is exerted on the drawer and also on the pressure arm. Therefore, the guide means for the drawer can generally be simple, because in principle no transverse forces are exerted on the drawer during the cooperation with the levers. Moreover, the above step results in an increased positioning accuracy of the disc pressure member.

Yet another embodiment is characterized in that the pressure-member support carrying the disc pressure member is movable out of and towards the operative position along a rectilinear guide which is secured to the frame. In the present embodiment the pressure-member support can be moved along the axis of rotation of the turntable, whilst the disc pressure member remains in a position which is oriented parallel to the turntable. This guarantees that during at least the final stage of its movement towards the turntable and in its operating position the disc pressure member presses the disc uniformly against the turntable. Preferably, when two levers are used, the pressure-member support carries a sliding block near each of the levers, which block is vertically movable along at least one sliding walls of the rectilinear guide.

Embodiments of the invention will now be described in more detail, by way of example, with reference to the accompanying drawings, in which FIG. 1 is a partly cut-away perspective view of a discrecord player in accordance with a first embodiment of the invention, FIG. 2 is a perspective view showing a part of the first embodiment to an enlarged scale, FIG. 3 is an enlarged-scale side view of a part of the first embodiment, and FIG. 4 is a partly cut-away perspective view of a discrecord player in accordance with a second embodiment of the invention.

In the Figures corresponding parts bear the same reference numerals. The disc-record player in accordance with the invention shown in FIGS. 1 to 3 is a video-disc player, which comprises a housing 1 with a front wall 3, an actuating button 5, a front opening 7 and a rear wall 9. The housing 1 accommodates a frame 11, which supports a turntable 13 and an electric motor coupled to said turntable, for rotating the turntable about an axis of rotation 15. The frame further supports an optical unit 17, which is movable in a radial direction relative to the turntable 13 for optically reading the information on the optically readable disc placed on the turntable as it is rotated. During read-out the optical unit moves in a radial direction through an elongate opening 19 formed in the frame 11. Said disc is not shown for the sake of clarity.

Further, the disc-record player comprises a disc-loading mechanism, which mechanism comprises a drawer 21, which is rectilinearly movable through the front opening 7 in the front wall 3 in an inward direction indicated by an arrow A and an outward direction indicated by an arrow B to transfer the disc to and remove it from the turntable. In the position shown in FIG. 1 the drawer 21 is in the almost fully retracted position. The housing 1 carries guide means for the drawer 21, which means comprise on each side of the drawer a strip 23 which carries a plurality of rollers 25 and is secured to the frame and a rail 27 which is secured to the drawer, the strips 23 and the rails 27 extending parallel to each other and the rollers 25 cooperating with the rail 27.

The drawer 21 comprises a transfer means 29 for supporting the disc. The transfer means 29 is situated between two side walls 31 of the drawer 21 and is movable relative to said drawers in a vertical direction, i.e. parallel to the axis of rotation 15. For this purpose the side walls 31 are formed with slots 33 near the front and the back of the drawer 21, which slots are downwardly inclined in the forward direction, and the transfer means comprises four pins 35 which are movable in the slots 33. At their ends the downwardly inclined slots 33 each adjoin a horizontal slot portion 33A whish is situated higher and a horizontal slot portion 33B which is situated lower. In the extended position and during the greater part of the inward movement and the outward movement of the drawer the pins 35 are situated in the slot portion 33A, as shown in FIG. 1. At the side facing the rear wall 9 the transfer means 29 comprises two wheels 37, which run against the rear wall 9 briefly before the drawer 21 reaches the fully retracted position. This precludes a further movement of the transfer means 29 in the inward direction of the drawer 21 and ensures that as the movement of the drawer 21 continues the pins 39 are guided in the slots 33, causing the transfer means 29 to perform a vertical downward movement and the wheels 37 to run along the rear wall 9. The above arrangement of the transfer means in the drawer is dimensioned in such a way that the said vertical movement of the transfer means 29 is performed after the disc has reached a coaxial position above the turntable 13. When the drawer is in the fully retracted position, the pins 35 are situated in the slot portions 33B and the transfer means has reached its lowest level. The disc is then situated on the turntable 13 and is clear of the transfer means 29. For a more detailed description of the construction and the movement of the transfer means reference is made to Netherlands Patent Application No. 8302129 (PHN. 10.702) (herewith incorporated by reference).

The loading mechanism further comprises a disc pressure member 37 for pressing the disc against the turntable. The disc pressure member 37 is carried by a pressure-member support 39 which is movable between a position in which it is situated at a specific distance from the turntable 13 and an operative position in which the disc pressure member 37 exerts pressure on the disc (FIG. 1 shows an intermediate position). The movement of the pressure-member support 39 carrying the disc pressure member 37 out of and towards the operative position is derived from the rectilinear movement of the drawer 21. For this purpose the frame in the housing 1 carries two levers 41 on opposite sides of the drawer 31. The two levers 41 each comprise a first lever arm 41A and a second lever arm 41B and they are each pivotable about a pivotal axis 43. The first lever arms 41A are coupled to the pressuremember support 39 by means of open pin-and-hole connection, the first lever arms 41A each having an open-ended hole 45 which is engageable with a pin 47 connected to the pressure arm 39 (see in particular FIG. 2). In order to enable the disc pressure member 37 to be moved parallel to the axis of rotation 15 of the turntable 13, there is provided a rectilinear guide for the pressure-member support 39. On each side of the drawer the rectilinear guide comprises a substantially H-shaped sliding block 49 and two sliding walls 50 between which an elongate opening 54 is formed, through which opening 54 the sliding block 49 is vertically movable. The sliding block 49 are each provided with a mounting block 49A in which a bolt 55 is fitted to secure each sliding block 49 to the pressure-member support 39. The sliding walls 50, which cooperate with the sliding blocks 49, form part of the frame 11.

The second lever arms 41B of the levers 41 each carry a first coupling means which is cooperable with a second coupling means on the drawer 21. The cooperation between the first coupling means and the second coupling means is such that towards the end of the inward movement of the drawer 21, when the transfer means 29 may be in an intermediate position, the levers 41 are caused to pivot about the pivotal axis 43 in the direction indicated by the arrow C in FIG. 1. By means of the open pin-hole connections 45, 47 this pivotal movement is converted into a vertical downward movement of the sliding blocks 49 and hence of the pressure-member support 39 and the disc pressure member 37.

In order to ensure that the levers 41 are pivoted through the desired angle in said direction indicated by the arrow C and at the correct instant the second lever arms 41B each carry a guide element which in the present embodiment is constructed as a rotatable roller 51 and on opposite sides the drawer 21 is provided with an inclined wall portion 53 near the side 21A which faces the rear wall 9, which wall portion extends obliquely downwards viewed in the inward direction of movement of the drawer 21 (see also FIG. 3). The wall portions 53 function as second coupling means and, as in the present example, they are preferably situated in inclined grooves 55. The rollers 51 are rotatable about spindles 51A mounted on the levers 41. Instead of rotatable rollers fixed projections, such as pins, may be employed as guide elements. The levers 41 are pivoted in the direction indicated by the arrow C when during the inward movement of the drawer 21 the rollers 51 are guided by the inclined wall portions 53 of the drawer. If inclined grooves are employed inclined groove-bounding wall portions 57 will be situated opposite the wall portions 53, along which portions 57 the rollers 51 move during the outward movement of the drawer 21, so that the levers 41 are forced to pivot about the pivotal axes 43 in a direction opposite to that indicated by the arrow C. In this way the levers are returned to their initial positions and the disc pressure member is moved out of its operative position. Between the frame 11 and the levers 41 helical springs 58 may be arranged to keep the levers in the last-mentioned inoperative position when the drawer is slid out, so that when the drawer is slid in the rollers 51 ar situated at the correct level relative to the grooves 55. For a smooth guidance of the rollers in the grooves 55 the drawer comprises slighlty inclined guide surfaces 59 adjoining the inclined wall portions 53. To limit the angles through which the levers 41 can pivot it is advisable to provide horizontal guide surfaces 59A in the side walls of the drawer 21 to support the rollers 55 in the fully retracted position of the drawer.

In order to obtain the sliding movements of the drawer 21 the player comprises an electric motor, whose pulley 61 is visible in FIG. 1. Two friction wheels 65A and 65B, which are journalled in the frame 11, can be rotated by means of a gear-and-belt transmission 63. The axes of rotation of the two friction wheels extend parallel to each other and the wheels are situated near the rear wall 9 of the housing 1. The friction wheels 65A an 65B are situated at some distance from one another and have friction surfaces 67 for rectilinearly moving a drive element 69 of the drawer 21 by means of friction, which drive element is situated between the friction wheels 65A and 65B.

In the present example the inward movement of the drawer 21 may be divided into a first stage of movement, in which the drawer is manually slid inwards, and a second stage of movement, in which the manually initiated movement is automatically continued by means of the electric motor 61. The transition from the first stage of movement to the second stage is effected at the instant at which a stop, not shown, on the drawer 21 actuates a first switch to start the electric motor 61. The dimensioning is such that at the instant at which the switch 71 is actuated the drive element 69 of the drawer 21 is already in contact with the friction surfaces 67 of the friction wheels 65A and 65B. The electric motor, which has been started by means of the switch 71, causes the friction wheels 65A and 65B to rotate in the directions indicated by the arrows D and E, respectively, so that the drawer 21 with the drive element 69 is moved towards the rear wall 9. The second stage of movement of the drawer terminates when a stop, not shown, on the drawer 21 actuates a second switch 73 to switch off the electric motor 61. The drawer 21 is then in the fully retracted position.

The embodiment of the invention shown in FIG. 4 also comprises a disc-loading mechanism. Only those parts of the record player which are specific to the present embodiment are shown. The parts not shown may be similar to those described for the preceding embodiment and will not be described in more detail. The loading mechanism comprises a drawer 21 which is movable through an opening 7 in a front wall 3 of a housing 1 and in the housing a pressure-member support 39 carrying a disc-pressure member 37. The drawer 21, which is shown in the extended position in FIG. 4, comprises side walls 31, which have low side-wall portions 31A in the middle. The drawer 21, which has also been provided with a transfer means 29, may have a width which is substantially equal to the diameter of the disc to be played, because the side wall portions 31A provide a satisfactory access to the transfer means when the disc is to be removed from said means.

The housing 1 accommodates a frame 11 on which two levers 41 are mounted at opposite sides of the drawer by means of a support 40 having a pivot 43. On opposite sides of the pivot 43, the levers 41 comprise two lever arms arranged after each other viewed in the inward direction of movement of the drawer 21, namely first lever arm 41A and a second lever arm 41B. Said pressure-member support 39 is secured to the first lever arms by means of screws 56. The second lever arms each comprise an inclined wall portion 53 which extends downwardly viewed in the inward direction of movement of the drawer. Adjoining the wall portions 53 the levers have guide surfaces 59, which are situated on the lower edges of the levers and which extend substantially over the entire length of the levers. In the extended position of the drawer 21, but also during the greater part of its inward movement, the levers are in the positions shown and the guide surfaces 59 extend horizontally. On opposite sides the drawer carries two rollers or pins 51 which are secured in the side walls 31, which pins 51 cooperate with the guide surfaces 59 during the inward movement of the drawer and of which the rearmost pins 51 cooperate with the wall portions 53 towards the end of the inward movement, thereby causing the levers 41 to pivot in the direction indicated by the arrow C in order to bring the pressure-member support 39 with the disc pressure member 37 into the operative position.

The wall portions 53 are situated in grooves 55 in the levers, which grooves further comprise groove-bounding wall portions 57 which extend parallel to the wall portions 53 and which serve for pivoting back the levers 41 when the drawer 21 is moved outwards from the fully retracted position.

What is claimed is:

1. A disc record player comprising
a frame,
a housing having a front opening therein,
a turntable mounted for rotation in said frame
a drawer movable horizontally on a rectilinear path in inward and outward directions through said opening for transferring a disc respectively to and from said turntable,
a pressure member support spanning said turntable and carrying a pressure member above said turntable for urging said disc against said turntable, said support being movable vertically between an operative position and an inoperative position remote therefrom, said support being movable along a pair of rectilinear guides in the frame on opposite sides of the turntable,
a pair of levers generally parallel to the direction of movement of said drawer on opposite sides thereof, each lever being pivotable about a spindle supported in said frame, each lever having a first lever arm extending from said spindle toward said front opening and a second lever arm extending from said spindle away from said front opening, each first lever arm cooperating with said pressure member support, each second lever arm carrying a first coupling means for cooperation with a respesctive second coupling means on the drawer, one of each pair of cooperating coupling means comprising a wall portion which is inclined viewed in the inward direction of movement of the drawer, a guide element of the other coupling means of each pair being moved over said wall portion during the inward movement of the drawer to cause the lever to be pivoted and the pressure member to be moved vertically into the operative position.

2. A disc-record player as claimed in claim 1, characterized in that the inclined wall portion forms part of a groove or slot in which the guide element is movable.

3. A disc-record player as claimed in claim 1, characterized in that the first coupling means of the second lever arm comprises a guide element constructed as a rotatable roller and the second coupling means of the drawer comprises said inclined wall portion.

4. A disc-record player as in claim 1 wherein each rectilinear guide comprises a sliding wall in a respective sidewall of said frame and a sliding block carried by a respective first lever arm, each sliding block being movable vertically along the sliding wall of the respective rectilinear guide.

5. A disc record player as in claim 4 wherein each first lever arm has a slot and each sliding block has a pin received in a respective slot.

* * * * *